3,838,005
METHODS FOR THE FRACTIONATION OF AMYLOSES
Masashi Kurimoto and Mikihiko Yoshida, Okayama, Japan, assignors to Hayashibara Company, Okayama, Japan
No Drawing. Filed Aug. 18, 1971, Ser. No. 172,900
Claims priority, application Japan, Aug. 28, 1970, 45/75,374
Int. Cl. C13l 1/00, 1/06
U.S. Cl. 195—31 R                                8 Claims

ABSTRACT OF THE DISCLOSURE

A solvent extraction process for fractionating an amylose powder having a range of D.P. values into a fraction having D.P. values above 50 and a fraction having D.P. values below 50. Solvents which may be used are warm water, an aqueous 3–6 carbon alkanol, aqueous acetone and an aqueous solution of a fatty acid.

The present invention relates to methods of fractionating amyloses into long-chained-macromolecular-amylose (degree of polymerization, hereinafter referred to as D.P., over 50) and short-chained-low-molecular-amylose (D.P. lower than 50) comprising gelatinizing any variety of starch slurry by heating, subjecting the gelatinized starch to the action of an alpha-1,6-glucosidase to debranch the branched linkages of starch into a mixture of linear chained amyloses, concentrating, dehydrating and drying the reaction mixture to give amyloses of powder form, in which long chain amylose is retrograded most firmly. Thereafter the short chain amylose is extracted from said powder of amyloses by warm water or an organic solvent and water mixture, and then the undissolved macromolecular amylose is separated from the dissolved low molecular amylose solution.

More particularly, starch consists generally of amylose, which possesses a linear structure and a D.P. of around 1,000, and amylopectin, a branched structure of starch which contains many branched chains. There are many varieties of native starches known, the amylose content of which is in the range of 80%–20%. All portions hereinafter are indicated by weight unless specified.

When an aqueous suspension of any of said native starches is gelatinized and consequently subjected to the action of an alpha-1,6-glucosidase, which is an enzyme that hydrolyzes selectively and exclusively the alpha-1,6-glucosidic linkages, namely the branched linkages of amylopectin, the starch can be converted completely into linear-chained molecules similar to amylose. Although the resultant starch hydrolysate, naturally, contains native-long-chained-amylose with D.P. of nearly 1,000, the hydrolysate also contains a large amount of molecules with D.P. of 15–50 owing to the hydrolysis of the branched linkages which were originally present on the amylopectin in the native starch. Therefore it is desirous to fractionate the short-chained-amylose (D.P. lower than 50) and the native amylose portion (D.P. over 50) prior to their employment in order to utilize their individual characteristics due to the differences of their D.P.'s.

As described hereinbefore, in the practice of fractionation of an amylose mixture with an extensive range of D.P. it is necessary to utilize the properties of the amyloses present in the amylose mixture, such as the differences of retrogradation characteristics, crystallizabilities, water solubilities, solubilities in aqueous organic solvents and dissolution velocities, which are a result of the differences of D.P. The methods the inventors suggested for the practice of fractionation were as follows.

(1) A method for the fractionation of amyloses by the water solubility differences of the amylose molecules.
(2) A method for the fractionation of amyloses utilizing the solubility differences of amyloses against aqueous solutions of inorganic salts such as magnesium sulfate.
(3) A method for the fractionation of amyloses utilizing their solubilities in complex compounds, such as n-butanol and others.

The purpose of fractionation can be realized to some extent by any of the above described methods. However, the separated precipitate of the long-chained amylose obtained by these methods still contain a large amount of solvent. Thus it is very difficult to increase the purity of this fraction. Other methods besides the one described above either require a large consumption of inorganic salts, which cause difficulty in the desalting procedure subsequent to separation, or require the employment of an organic solvent in the separation stage. Furthermore the methods possess another disadvantage in that if the amylose mixture possesses a concentration applicable for industrial practice, only an insufficient degree of separation can be attained.

Since most of these disadvantages are attributed to the fact that the amylose precipitate contains a large amount of residual solvents, the inventors succeeded in an alternative process of obtaining lower-water-content-precipitate, i.e. a method to accelerate the separation of liquid (solution) and precipitate. More particularly, the inventors succeeded in the development of a method which comprises freezing the amylose-containing solution, promotion of retrogradation of the amylose, thawing the frozen product with heating, and thus separating the retrograded long chain amylose from the supernatant with the dissolved short chain amylose.

According to the invention, retrogradation of long-chained-amylose and isolation of bonded water from amylose are effected by freezing the hydrolyzate product obtained by the hydrolysis with alpha-1,6-glucosidase, and thus by removing the liquid portion immediately after thawing, the separation of amylose into different D.P.'s can be performed with ease.

The above described method of separation by freezing and thawing also has certain disadvantages, however, in that it requires a complete freezing of a large amount of amylose solution and a re-heating up to 60° C.–70° C. In addition its industrial practice requires a relatively higher running cost.

Finally inventors studied various methods of separating the amylose precipitate from the solvents to find the most preferable way. Their studies resulted in the invention of the following process. Instead of separating long-chained-amylose as precipitate from the amylose solution, the amylose mixture in the form of a dry powder is suspended in a solvent. In this manner, the short-chained amylose contained in the amylose powder is eluted with ease, and the solution and solid mass consisting of long-chained amylose is separated before the swelling of the long chain amylose particles can proceed. The method was found very effective exhibiting a desirable separation efficiency. Hereinafter the long-chained amylose fraction with a D.P. exceeding 50 will be abbreviated "L," and the short-chained amylose fraction with a D.P. which lies in the range of 15–50 "S."

More particularly, the fraction of the above two amylose fractions which permeates the Diaflo Ultrafiltration Membrane PM-30, a product of Amicon Corporation, U.S.A., is designated as S, while the fraction which is impermeable against the membrane is designated as L.

The inventors studied the formation of amylose precipitate in aqueous amylose solution. The findings were as follows. The L fraction forms into an irregular, fiber-like mass which eventually is bound by the hydrogen bonds, and precipitates easily. Since the solubility of the L fraction in the supernatant is about 5% at 65° C.–75° C., and that of the S fraction at the same temperature is 16%–19.5%, the excessive amylose precipitates. Furthermore the L fraction forms into retrograded starch as described above. The fraction is hydrated with water to an extent such that the water content of the fraction is over 90% by weight. Although the precipitate of the S fraction exhibits a relatively high crystallinity by X-ray analysis, since the precipitate contains a large amount of water the dehydration of the fraction is extremely difficult. Therefore, since the water content of the L fraction precipitate which is over 90% contains S fraction dissolved therein, much difficulty is eventually caused in the subsequent separation of both of the fractions. However, if the amylose mixture solution is either dried with an air-flow dryer and pulverized, or spray-dried and dehydrated subsequent to concentrating the amylose mixture solution, then suspended in warm water or a warm mixture of solvents, and stirred, the S fraction dissolves rapidly by stirring until it reaches a concentration of 13%–17%, however, further stirring for an additional 60–120 minutes will merely increase slightly the concentration of the solution. On the other hand the dissolution of L fraction stops at a concentration of 0.2%–1.5% under similar conditions and the concentration is much lower than that of the supernatant of the saturated solution on cooling. The concentration of S fraction approaches substantially to 14%–17% of that of the supernatant of the saturated solution.

Although a similar phenomenon was observed with cooling a saturated solution of amylose mixtures, since the hydrophilicity of the L fraction present in the solution is much higher than that of dried powder, a several percent of the L fraction comes out in the supernatant solution, and the L fraction precipitate possesses a high water content. Thus the subsequent separation is quite difficult.

On the other hand, if the dried amylose powder is suspended in warm water, the L fraction present in the dehydrated and dried amylose loses its moisture content, is retrograded firmly by the hydrogen bonds, decreases its solubility greatly, and can be dissolved in warm water to only a concentration of 0.2%–1.5%, while the S fraction, having a crystalline structure, dissolves easily in warm water, and most of it can be extracted within an extremely short time.

As described above, if the amylose powder is suspended in warm water of a volume sufficient to dissolve the S fraction which is present in the powder and is stirred, the S fraction is extracted efficiently and only an extremely small portion of the L fraction dissolves. Therefore, most of the L fraction remains in the insoluble residual solid in powder form. That is, the extracted solution comprises mostly S fraction and the residual solid can be separated as the portion which consists mainly of L fraction.

Furthermore, in the above case the insoluble residual amylose is different from the precipitate of the saturated amylose solution in that its moisture content is lowered to 60%–75%, possessing a relatively firmer granular form exhibiting a lower swelling state and in that its separation from the mother liquor is very easy. In other words, the extracted solution consists mainly of S fraction and the insoluble amylose does not swell resulting in easily performing separation of the amylose from the solution. The discovery of these two findings resulted in the development of the present invention.

Based on the above reasons, the dried powder of amylose was first retrograded as firmly as possible by dehydration. Secondly, since this is an extraction of a solid-liquid phase system it is preferable to use amylose in a fine powder form with the maximum surface area. Therefore, it is necessary to dry, and pulverize the amylose into a fine powder form without excessively raising the temperature of the concentrated amylose solution to promote retrogradation of amylose. For this purpose, the highly concentrated amylose solution should be either dried with aeration and pulverized or spray-dried to obtain retrograded porous granular material or dried with the employment of a pneumatic conveying drier.

Although water is a solvent in which amylose is highly soluble a mixture of water and water miscible organic solvents, such as n-butanol, propanol, fatty acids, acetone, etc., which form complex compounds easily with amylose, are employable in the invention. For example, when amylose is extracted using warm water containing 7% n-butanol, S fraction can be extracted to a concentration of 18%–18.5% compared to the concentration extracted with water of 13%–16%. In both cases the extraction concentration of the L fraction remains 0.5%–1%. It can be assumed that this fact is attributable to the formation of helical complexes of n-butanol and S amylose, which facilitates the extraction of the S fraction.

Since the method mentioned above is based on the difference of the rate of dissolution of amyloses at the non-equilibrium state of the system comprising L fraction, S fraction and solvent, not at the equilibrium state, and it is desired to avoid the swelling of amylose powder by warm water, it is necessary to decrease the extraction time as much as possible and to separate solid from the solution as quickly as possible to extract the S fraction effectively. Generally speaking, it is preferable to extract and separate the insoluble residue from the solution at 60° C.–80° C. within 1–20 minutes.

The process according to the invention will be described in detail. As for the amylose mixture to be used as starting material, amylose fractionated from starch is employable. However, in order to produce an amylose mixture which contains amylose with a D.P. lower than 50 with which the present invention is more preferably concerned, starches which contain amylopectin such as amylomaize starch, corn starch, sweet potato starch, potato starch, tapioca starch, sago starch and wheat starch are employable. A starch suspension prepared with a variety of the starches described above is heated and stirred at 100° C.–170° C., gelatinized to a D.E. (dextrose equivalent, hereinafter referred to as D.E.) lower than 0.5%, then cooled to 40°–60° C. whereupon a culture broth which contains alpha-1,6-glucosidase, which is obtained by culturing any strain selected from the group comprising *Pseudomonas amyloderamosa* ATCC 21216, *Escherichia intermedia* ATCC 21073, *Lactobacillus brevis* IFO 3345, *Nocardia asteroides* IFO 3384, and *Micrococcus lysodeikticus* IFO 3333, is added to the gelatinized starch, taking caution not to effect retrogradation of the starch. The mixture is incubated to debranch the branched linkages of amylopectin. The resultant is a mixture exclusively of linear chained amylose. More particularly, the resultant consists of native amylose, which is the long chained amylose fraction with a D.P. exceeding 50 and found originally in the starting material starch, and short chained amylose which is formed by the hydrolysis of the amylopectin fraction in the starting material starch.

The amylose mixture described above is concentrated to a concentration of over 30%, stirred and cooled to promote retrogradation or crystallization of amylose. It is thereafter dehydrated and dried by any of the usual drying methods, such as the spray drying method, the air flow drying method (the drying method with aeration), or the drum drying method. The moisture content is brought down to less than 18% and the product with a granular size which passes a 100 mesh screen is used in the subsequent procedures. It is preferable to pulverize the dried product obtained by the aeration drying or drum drying method to a fine powder form which will pass a 100 mesh screen. Since the spray-dried product is in a porous form the objects of the invention can be realized with a product of a granular size which lies in the range of 20–100 mesh.

There is no particular limitation for the temperature of extraction when using a solvent, however, it is preferable to perform the extraction in a temperature range of 40° C.–80° C. from the view of the solubility of amylose. A heating at over 80° C. for a period of 1–60 minutes effects adsorption of water in the amylose powder which results in swelling of the amylose powder and makes separation of solid and liquid difficult. Moreover, if the extraction is performed at lower than 40° C. a longer period is required for extraction.

Since most of the S fraction can be dissolved with stirring for about two minutes, it is preferable to conduct the extraction at 60° C.–75° C. within 20 minutes. Extraction at this temperature range using water as solvent is possible until the extraction solution concentration reaches 13%–17%, and in case a 7% aqueous n-butanol solution is used extraction is possible until the concentration reaches 18%–18.5%. In this case the L fraction will be extracted with water to a concentration of less than 1.5%, whereas with a n-butanol-water system to 0.5%–1%.

The amount of water required for extraction is determined by using the above solubility of the S fraction. An amount of water sufficient to effect extraction of the S fraction in the total solid is required. With the addition of solvent which gives a 10%–25% amylose solution most of the S fraction can be extracted from the amylose powder obtained from ordinary starch. Since the amylose obtained by debranching amylomaize starch contains a lower amount of S fraction, a similar result is attainable even with a less amount of solvent.

Since, however, the invention relates to an extraction of a solid-liquid phase system, it is difficult to extract completely the inner portion of the granular amylose with a single run of extraction, fresh warm water should be added again to the extraction product, to effect a second extraction, and, if necessary, a third extraction procedure may be performed. Because extraction of the S fraction in the inner portion of the amylose granules is difficult, in the second and third runs of extraction the efficiency of extraction is extremely decreased. More particularly, the extraction solution concentration goes down to 10% and 5% respectively.

Therefore in the case where a complete separation is desirable, it is preferable to swell the insoluble amylose again with an addition of water and heating, then drying and pulverizing the resultant and thereafter conducting an additional extraction run.

According to the above described process an amylose powder which is obtained by hydrolyzing an ordinary starch and which possesses about 30% of L fraction can be purified to an amylose in which the L fraction level exceeds 90%.

The present invention will be illustrated further by the following examples, which are illustrative only and the invention is not limited thereto. All portions are given by weight unless specified otherwise.

EXAMPLE 1

(A) Preparation of amylose powder to be used as starting material

Either corn starch or amylomaize starch (apparent content of native amylose 50%) was washed with water, prepared into a 15% starch slurry, heated for 15 minutes at 135° C. with continuous stirring, then the resultant homogeneously gelatinized solution, D.E. 0.5, was cooled rapidly, and at 50° C. and pH 3.5, 50 units of alpha-1,6-glucosidase isolated from a culture broth of *Pseudomonas amyloderamosa* ATCC 21216 per gram starch are added, and then the mixture was incubated at 45° C. for 35 hours. The resultant hydrolyzate was concentrated to 30% with the employment of a vacuum evaporator equipped with a rotary coil. Half of the concentrated product was dried with aeration at 50° C.–60° C., and the remaining half was spray dried using pneumatic atomizing nozzles. The former was pulverized and sifted with a 100 mesh screen. A sample of the product which passed the screen was collected and assayed. The latter spray dried product was of fine powder which passed the 100 mesh screen. The moisture contents of each were 3%–7%, respectively.

The samples were assayed by fractionation using Ultrafiltration membrane PM–30, which showed that the sample prepared with corn starch contained 70% of S fraction and the sample obtained with amylomaize starch contained about 50%.

(B) Extraction of the corn starch hydrolyzate (amylose) dried by aeration 1,000 gr. dry solid, of the corn starch hydrolyzate, which is amylose, dried by aeration as described above, was suspended in 4,150 ml. of water to give 5,150 gr. of a 19.4% mixture. The mixture was kept at 70° C. under stirring conditions for 15 minutes, whereupon the mixture was centrifuged immediately with a basket type centrifugal separator to fractionate the undissolved amylose. 1,730 gr. of insoluble residue was obtained. The dry solid of the residue was 521 gr. which consisted of L fraction 260 gr. and S fraction 261 gr., i.e. the S:L ratio was approximately 50:50.

The extraction solution weighed 3,420 gr. and contained 14% of dry solid, and 40 gr. of the L fraction which is only 13% of the L fraction present originally in the L fraction of the starting material, while a large amount of the S fraction was extracted.

To the reprecipitated portion was added 1,745 ml. of warm water of 70° C. to give a 15% suspension, whereupon the suspension was kept at 70° C. and stirred again for 15 minutes, and then immediately centrifuged. 430 gr. of precipitate was obtained as solid.

The insoluble amylose precipitate contained 237 gr. of L fraction and 193 gr. of S fraction, showing a S:L ratio of 45:55. Similarly, the precipitate was extracted with an equal volume of warm water; however, the amount that could be extracted was extremely small increasing the S:L ratio very slightly.

(C) Redrying and extraction of insoluble residual amylose powder

To the insoluble residual amylose obtained by a single extraction run as described above was added water, gelatinized by heating, then retrograded again, dried and pulverized. The powder product was sifted with a 100 mesh screen and then 500 gr. of the product which passed the screen was admixed with 1,500 ml. of warm water, 70° C., to give a 25% solution. The mixture was stirred for 15 minutes and centrifuged. The insoluble amylose was then prepared again into a 17.4% suspension which was thereafter extracted and centrifuged. Similarly, a third run of extraction was carried out with a 15% suspension. Thus a product which contained 94% of amylose L fraction was obtained. The L fraction product had a yield of 71% against the L fraction originally found in the starting material. No increase in the S:L ratio was attained by the following extraction. The results obtained are given in Table 1.

EXAMPLE 2

The amylomaize starch hydrolyzate in powder form obtained by the procedure described in Example 1(A) was treated similarly as in Example 1(C). The hydrolyzate was stirred at 75° C. for 20 minutes and triplicate extraction was carried out. The product obtained by the first extraction possessed an insoluble amylose L fraction of 64%, the product after the second extraction 81% and the third product 91%. The yield of the L fraction was 86% showing a desirable result.

EXAMPLE 3

A sample of the amylose powder, which was obtained by hydrolyzing corn starch and spray drying by the procedure described in Example 1(A), was extracted with warm water. First, a 10% suspension was prepared. The suspension was extracted at 75° C. for 20 minutes and separating the resulting solution of low molecular amylose from the undissolved residual macromolecular amylose.

TABLE 1

|  | 1st amylose powder dried after 1,6-glucosidase action | | 2nd amylose powder dried after 1st extraction | | |
|---|---|---|---|---|---|
|  | 1st E. | 2nd E. | 1st E. | 2nd E. | 3rd E. |
| Starting suspension for extraction: | | | | | |
| Weight of suspension (gr.) | 5,150 | 3,470 | 2,000 | 2,200 | 1,800 |
| Concentration of dry substance (percent) | 19.4 | 15 | 25 | 17.4 | 15.2 |
| Weight of dry substance (gr.) | 1,000 | 520 | 500 | 383 | 273 |
| S, L-fraction ratio (percent): | | | | | |
| S | 70 | 50 | 50 | 37 | 17 |
| L | 30 | 50 | 50 | 63 | 83 |
| S, L-fraction weight (gr.): | | | | | |
| S | 700 | 260 | 250 | 143 | 45 |
| L | 300 | 260 | 250 | 240 | 228 |
| Extracted solution: | | | | | |
| Weight of extracted solution (gr.) | 3,420 | 2,040 | 900 | 1,300 | 1,059 |
| Concentration (percent) | 14 | 4.4 | 13 | 8.5 | 4.9 |
| S, L-fraction weight (gr.): | | | | | |
| S | 440 | 67 | 107 | 98 | 38 |
| L | 40 | 23 | 10 | 12 | 14 |
| Insoluble residue: | | | | | |
| Weight of residual (gr.) | 1,730 | 1,430 | 1,100 | 900 | 741 |
| S, L-fraction ratio (percent): | | | | | |
| S | 50 | 45 | 37 | 17 | 6 |
| L | 50 | 55 | 63 | 83 | 94 |
| S, L-fraction weight (gr.): | | | | | |
| S | 260 | 193 | 143 | 45 | 13 |
| L | 260 | 237 | 240 | 228 | 213 |
| Yield: Yield of L-fraction (percent), against L-fraction in starting material | 87 | 79 | 80 | 76 | $7_1$ |

Note.—E.=Extraction.

thereafter immediately centrifuged. The certrifugation of the insoluble amylose powder thus obtained was always found to be easy. Furthermore, since the powder is in a porous state, a successive triplicate extraction showed a raise in the L fraction content in the insoluble powder after centrifugation from 41% to 62% and finally to 78% after the third extraction, from the initial content of 30% in the starting material starch. The content figures show the ease of fractionating S fraction in the inner portion of porous granular amylose. In this case the yield of L fraction was 50% showing a considerable decrease.

EXAMPLE 4

The amylose powder produced by spray-drying the corn starch hydrolyzate obtained in Example 1(A) was prepared into a 25% suspension, which was thereafter extracted at 75° C. for 10 minutes. In this example a 7% aqueous n-butanol solution was used as solvent. Furthermore, the residue of amylose was extracted successively three times, resulting in the increase of L fraction contents, i.e. the L fraction contents were 30% in the starch used as starting material, and those of the triplicate extraction products 45%, 59% and 75%. However, the yield of L fraction decreased to about 50%. The inventors found that the solubility of amylose increases with butanol, that both the L and S fractions dissolve easily by the successive extraction, and that although the ratio of L fraction increases, the yield tends to decrease. Therefore the inventors attempted extraction with a decrease in the initial concentration of the suspension to 15% and found that a product with a L fraction content of 75% could be produced by the second extraction and that the yield could be raised up to about 75%.

What we claim is:

1. A process for the fractionation of amylose into macromolecular amylose having a D.P. greater than 50 and low molecular amylose having a D.P. less than 50, comprising:
    combining a dried mixture of amylose in powder form which possesses a variety of D.P. levels including D.P.'s above 50 and D.P.'s below 50 with a solvent selected from the group consisting of warm water, an aqueous solution of an alkanol containing 3–6 carbon atoms, an aqueous solution of a fatty acid and an aqueous solution of acetone for a time sufficient to dissolve a portion of the low molecular amylose and leave a portion of the macromolecular amylose undissolved; and
    separating the resulting solution of low molecular amylose from the undissolved residual macromolecular amylose.

2. A process in accordance with Claim 1, further including the steps of:
    concentrating said solution of low molecular amylose obtained by said separating step;
    drying said concentrated amylose;
    pulversizing said dried amylose; and
    repeating said combining and separating steps using said pulverized amylose as said dried amylose mixture therein.

3. A process in accordance with Claim 1 further including the steps of:
    drying said separated macromolecular amylose;
    pulverizing said dried amylose; and
    repeating said combining and separating steps using said pulverized amylose as said dried amylose mixture therein.

4. A process in accordance with Claim 1 wherein said combining step takes place at 60–80° C. within 1–20 minutes with stirring.

5. A process in accordance with Claim 1 comprising as preliminary steps:
    gelatinizing any variety of starch by heating;
    debranching the amylopectin in said gelatinized starch by the subjection of $\alpha$-1,6-glucosidase thereto; and
    drying the product of said debranching step to a powder form;
    wherein said mixtures of amylose used in said combining step are those produced by said drying step.

6. A process in accordance with Claim 5 wherein said drying step comprises:
    concentrating the product of said debranching step; and
    spray drying.

7. A process in accordance with Claim 5 wherein said drying step comprises:
    concentrating the products of said debranching step;
    drying with aeration; and
    pulverizing.

8. A process in accordance with Claim 7 wherein said pulverizing step results in a material with a granular size which passes a 100 mesh screen.

References Cited

UNITED STATES PATENTS

| 3,632,475 | 1/1972 | Sugimoto et al. | 195—31 |
| 3,721,605 | 3/1973 | Yoshida | 195—31 R |
| 3,766,011 | 10/1973 | Kurimoto | 195—31 R |

(Other references on following page)

OTHER REFERENCES

Chemical Abstracts, 45:7810f (1951).

"Starch: Chemistry and Technology," Roy L. Whistler, ed., vol. 1, 334-343, Academic Press, New York, 1965.

R. Geddes et al.: Makromolekulare Chem., 79, 189-206 (1964).

MORRIS O. WOLK, Primary Examiner

S. MARANTZ, Assistant Examiner

U.S. Cl. X.R.

127—38, 69, 71